(12) United States Patent
Xin et al.

(10) Patent No.: US 11,481,078 B2
(45) Date of Patent: Oct. 25, 2022

(54) DISPLAY PANEL AND DISPLAY DEVICE

(71) Applicants: WUHAN TIANMA MICRO-ELECTRONICS CO., LTD., Wuhan (CN); WUHAN TIANMA MICROELECTRONICS CO., LTD. SHANGHAI BRANCH, Shanghai (CN)

(72) Inventors: Yu Xin, Shanghai (CN); Lijing Han, Shanghai (CN); Qingxia Wang, Shanghai (CN)

(73) Assignee: WUHAN TIANMA MICROELECTRONICS CO., LTD., Shanghai (CN)

( * ) Notice: Subject to any disclaimer, the term of this patent is extended or adjusted under 35 U.S.C. 154(b) by 0 days.

(21) Appl. No.: 17/406,891

(22) Filed: Aug. 19, 2021

(65) Prior Publication Data

US 2021/0382584 A1 Dec. 9, 2021

(30) Foreign Application Priority Data

May 27, 2021 (CN) .......................... 202110606662.3

(51) Int. Cl.
*G06F 3/044* (2006.01)
*G06F 3/041* (2006.01)

(52) U.S. Cl.
CPC .......... *G06F 3/0446* (2019.05); *G06F 3/0445* (2019.05); *G06F 3/0412* (2013.01)

(58) Field of Classification Search
CPC ................. G06F 3/0445; G06F 3/0446; G06F 2203/04111; G06F 3/0412
See application file for complete search history.

(56) References Cited

U.S. PATENT DOCUMENTS

| | | | | |
|---|---|---|---|---|
| 2012/0105343 | A1* | 5/2012 | Lee | G06F 3/0446 345/173 |
| 2014/0204283 | A1* | 7/2014 | Huh | G06F 3/0443 349/12 |

(Continued)

FOREIGN PATENT DOCUMENTS

| | | |
|---|---|---|
| CN | 101685362 A | 3/2010 |
| CN | 102004572 A | 4/2011 |

(Continued)

*Primary Examiner* — Deeprose Subedi
(74) *Attorney, Agent, or Firm* — Christensen O'Connor Johnson Kindness PLLC

(57) ABSTRACT

A display panel and a display device are provided. The display panel includes first and second touch electrodes. The first touch electrode includes first touch sub-electrodes arranged along a first direction, an island electrode located between two adjacent first touch sub-electrodes, and a first connection portion. The island electrode and the first touch sub-electrodes are provided in a same layer. A first gap is formed between the island electrode and the first touch sub-electrode. The first connection portion connects the first touch sub-electrode and its adjacent island electrode. The first connection portion and the first touch sub-electrode are provided in different layers. The second touch electrode includes at least two second touch sub-electrodes provided along a second direction intersecting with the first direction, and a second connection portion connecting two adjacent second touch sub-electrodes. The second connection portion and the second touch sub-electrode are provided in different layers.

18 Claims, 9 Drawing Sheets

(56) References Cited

U.S. PATENT DOCUMENTS

2015/0220191 A1\* 8/2015 Huh ...................... G06F 3/0443
                                                      345/173
2020/0089350 A1\* 3/2020 Han ...................... G06F 3/0448

FOREIGN PATENT DOCUMENTS

| CN | 103970335 A | 8/2014 |
| CN | 107957799 A | 4/2018 |
| CN | 110764659 A | 2/2020 |

\* cited by examiner

DISPLAY PANEL AND DISPLAY DEVICE

CROSS-REFERENCE TO RELATED APPLICATIONS

The present disclosure claims priority to Chinese Patent Application No. 202110606662.3, filed on May 27, 2021, the content of which is incorporated herein by reference in its entirety.

TECHNICAL FIELD

The present disclosure relates to the field of display technologies, and particularly, to a display panel and a display device.

BACKGROUND

In recent years, with the rapid development of digital information and wireless mobile communication technologies, in order to achieve purposes of portability and compact construction, an input manner of many electronic products, such as a mobile phone and the like, is changed from using traditional keyboard or mouse to using a touch screen as an input device.

In order to integrate a touch function into the display panel, it is necessary to provide a touch electrode in the display panel. Therefore, achieving electrical reliability of the touch electrode, improving antistatic capability of the touch electrode, and avoiding electrostatic damage to the touch electrode remains a focus of research.

SUMMARY

In a first aspect of the present disclosure, a display panel is provided. The display panel includes a substrate, and a first touch electrode and a second touch electrode that are located at a side of the substrate. The first touch electrode includes at least two first touch sub-electrodes arranged along a first direction, an island electrode located between two adjacent first touch sub-electrodes of the at least two first touch sub-electrodes, and at least one first connection portion. The island electrode and the at least two first touch sub-electrodes are located in a same layer. A first gap is formed between the island electrode and one of the at least two first touch sub-electrodes. One of the at least one first connection portion connects one of the at least two first touch sub-electrodes and the island electrode that are adjacent to each other. The at least one first connection portion is located in a different layer from the at least two first touch sub-electrodes. The second touch electrode includes at least two second touch sub-electrodes provided along a second direction, and at least one second connection portion connecting two adjacent second touch sub-electrodes of the at least two second touch sub-electrodes. The at least one second connection portion and the at least two second touch sub-electrode are provided in different layers. The first direction intersects with the second direction.

In a second aspect of the present disclosure, a display device is provided. The display device includes the above display panel.

BRIEF DESCRIPTION OF DRAWINGS

In order to more clearly illustrate technical solutions of embodiments of the present disclosure, accompanying drawings used in the embodiments are briefly described below.

The drawings described below are merely a part of the embodiments of the present disclosure. Based on these drawings, those skilled in the art can obtain other drawings.

DESCRIPTION OF EMBODIMENTS

In order to better understand technical solutions of the present disclosure, the embodiments of the present disclosure are described in details with reference to the drawings.

It should be clear that the described embodiments are merely part of the embodiments of the present disclosure rather than all of the embodiments. All other embodiments obtained by those skilled in the art shall fall into the protection scope of the present disclosure.

The terms used in the embodiments of the present disclosure are merely for the purpose of describing specific embodiments, rather than limiting the present disclosure. The terms "a", "an", "the" and "said" in a singular form in the embodiments of the present disclosure and the attached claims are also intended to include plural forms thereof, unless noted otherwise.

It should be understood that the term "and/or" used in the context of the present disclosure is to describe a correlation relation of related objects, indicating that there may be three relations, e.g., A and/or B may indicate A alone, A and B, and B alone. In addition, the symbol "/" in the context generally indicates that the relation between the objects before and after the "/" is an "or" relation.

It should be understood that although the terms 'first', 'second' and 'third' may be used in the present disclosure to describe touch electrodes, these touch electrodes should not be limited to these terms. These terms are used only to distinguish the various different touch electrodes from one another. For example, without departing from the scope of the embodiments of the present disclosure, a first touch electrode may also be referred to as a second touch electrode. Similarly, the second touch electrode may also be referred to as the first touch electrode.

Figure 1:
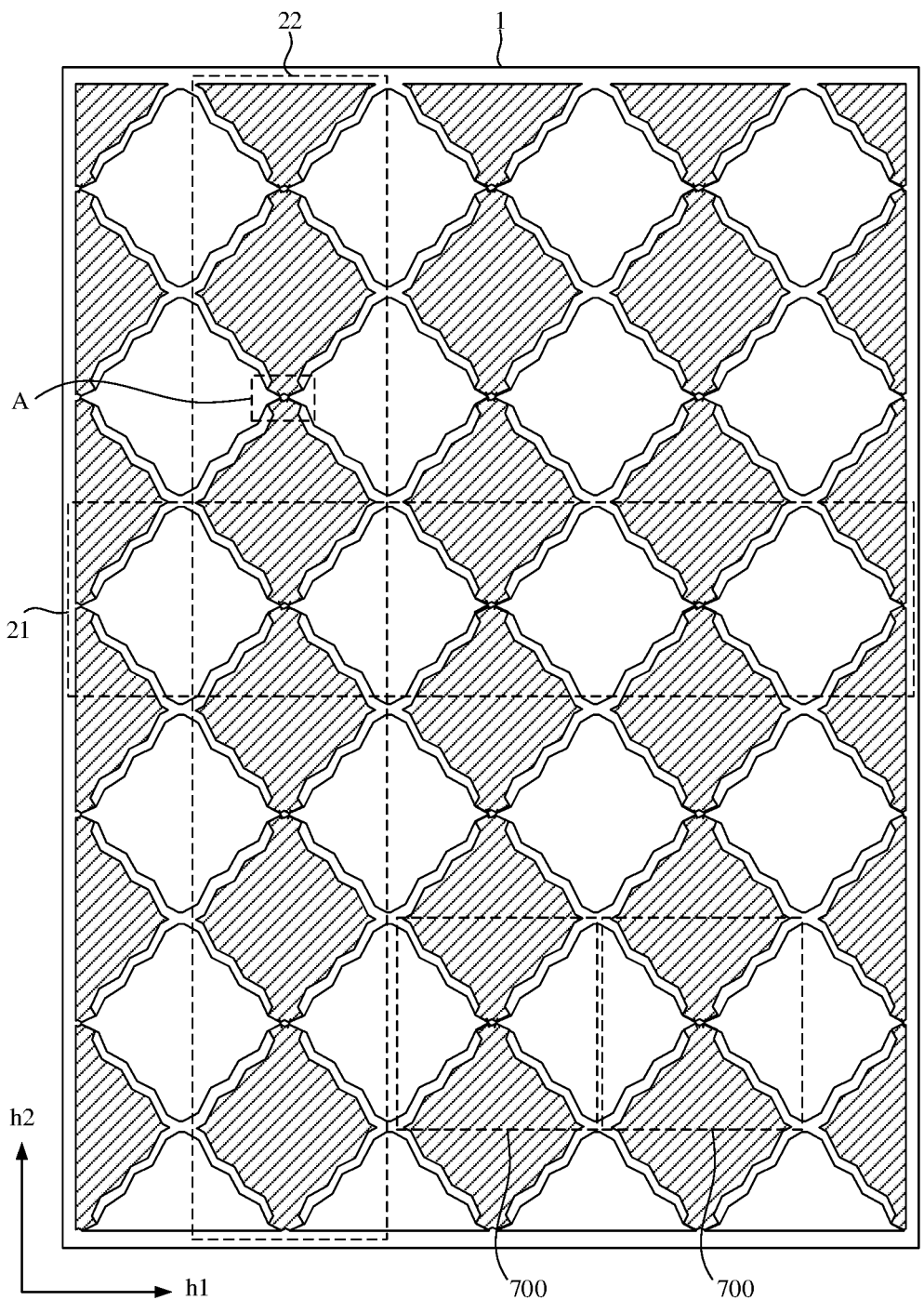
FIG. 1 is a schematic diagram showing a display panel according to an embodiment of the present disclosure.
Figure 2:
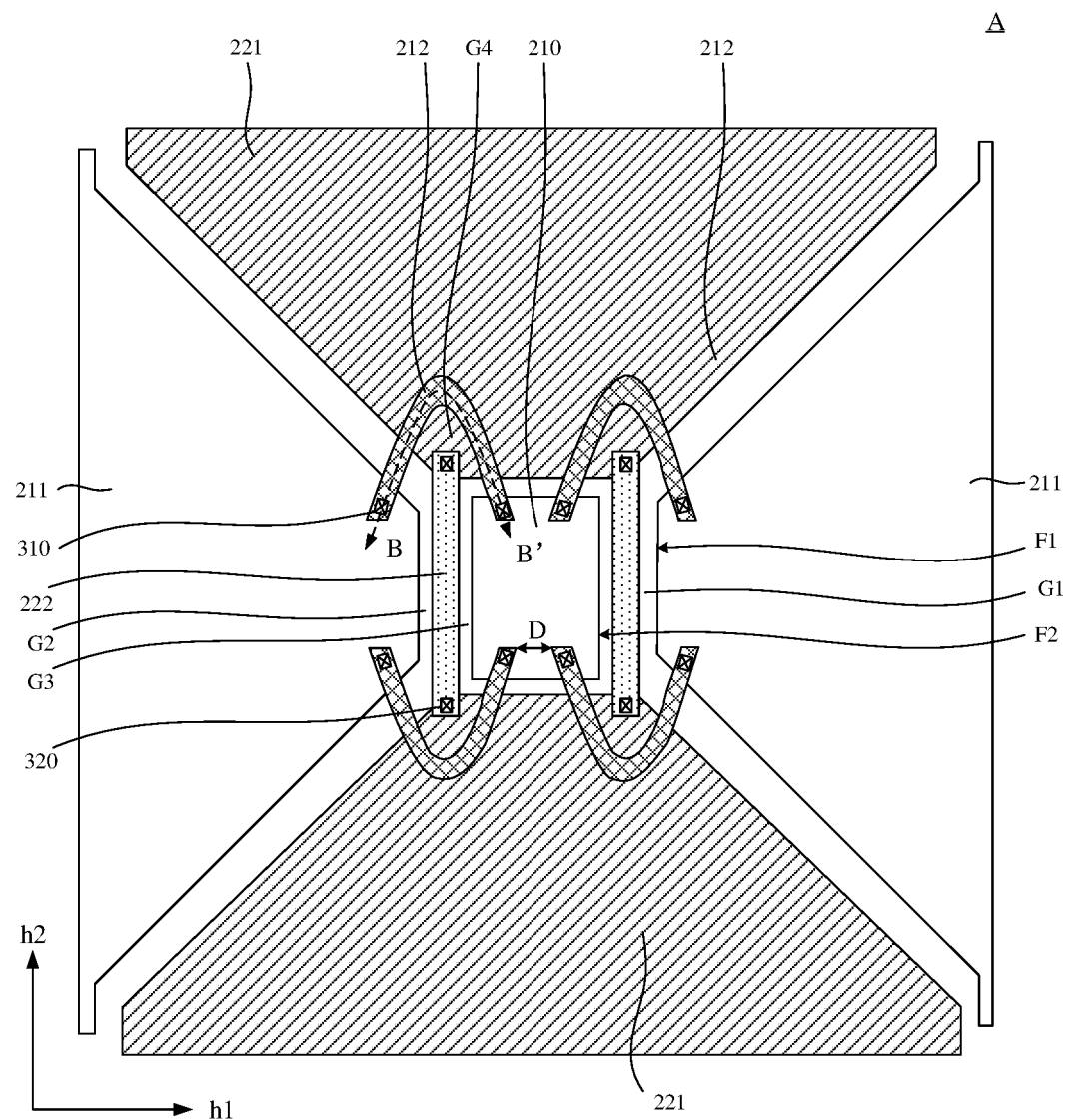
FIG. 2 is an enlarged schematic diagram showing the region A shown in FIG. 1.
Figure 3:
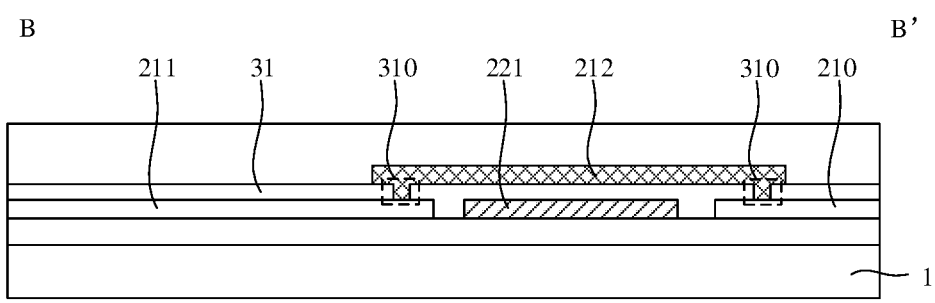
FIG. 3 is a schematic cross-sectional view taken along BB' shown in FIG. 2.

An embodiment of the present disclosure provides a display panel. FIG. 1 is a schematic diagram showing a display panel according to an embodiment of the present disclosure, FIG. 2 is an enlarged schematic diagram showing the region A shown in FIG. 1, and FIG. 3 is a schematic cross-sectional view taken along BB' shown in FIG. 2. As shown in FIGS. 1-3, the display panel includes a substrate 1, a first touch electrode 21 and a second touch electrode 22. The first touch electrode 21 and the second touch electrode 22 are located at a same side of the substrate 1.

The first touch electrode 21 includes at least two first touch sub-electrodes 211 arranged along a first direction h1, and an island electrode 210 located between two adjacent first touch sub-electrodes 211. As shown in FIG. 2, a first gap G1 is formed between an orthographic projection of the island electrode 210 on the plane of the substrate 1 and an orthographic projection of the first touch sub-electrode 211 on the plane of the substrate 1. The first touch electrode 21 further includes a first connection portion 212. The first connection portion 212 connects the first touch sub-electrode 211 and the island electrode 210 that are adjacent to each other.

The second touch electrode 22 includes at least two second touch sub-electrodes 221 arranged along the second direction h2, and a second connection portion 222 connecting two adjacent second touch sub-electrodes 221. The first direction h1 intersects with the second direction h2.

Exemplarily, as shown in FIG. 3, in an embodiment of the present disclosure, the first connection portion 212 and the first touch sub-electrode 211 can be provided in different layers. A first insulation layer 31 is further provided between the first connection portion 212 and the first touch sub-electrode 211. At least two first vias 310 are provided in the first insulation layer 31. The first connection portion 212 is electrically connected to the first touch sub-electrode 211 and the island electrode 210 via the first vias 310, respectively.

Exemplarily, as shown in FIG. 2, in an embodiment of the present disclosure, the second connection portion 222 and the second touch sub-electrode 221 are provided in different layers, and are electrically connected via the second via 320.

As shown in FIGS. 2-3, in an embodiment of the present disclosure, the island electrode 210 and the first touch sub-electrode 211 are provided in a same layer, and the first touch sub-electrode 211 and the second touch sub-electrode 221 are provided in a same layer. When the display panel is manufactured, the island electrodes 210, the first touch sub-electrodes 211, and the second touch sub-electrodes 221 can be formed by patterning with a same layer, thereby simplifying manufacturing processes of the display panel, improving process efficiency, and lowering cost.

When the display panel is used for a touch operation, the first touch electrode 21 as mentioned above can serve as a touch drive electrode, and the second touch electrode 22 can serve as a touch sensing electrode. In an embodiment, the second touch electrode 22 can serve as a touch drive electrode, and the first touch electrode 21 can serve as a touch sensing electrode, which is not limited in embodiments of the present disclosure.

In the display panel provided by the embodiments of the present disclosure, then island electrode 210 spaced a certain distance from the first touch sub-electrode 211 is provided in the first touch electrode 21, and the first touch sub-electrode 211 is connected to the island electrode 210 through the first connection portion 212, so that a direct connection between the first touch sub-electrode 211 and the island electrode 210 can be avoided, and antistatic damage ability of the first touch electrode 21 can be improved, thereby improving touch reliability of the display panel.

Exemplarily, as shown in FIG. 2, a same island electrode 210 is electrically connected to two first touch sub-electrodes 211 located at both sides of the island electrode 210 through at least two first connection portions 212. In an embodiment, as shown in FIG. 2, a shortest distance D between two adjacent first connection portions 212 electrically connected to a same island electrode 210 can be greater than zero.

Figure 4:
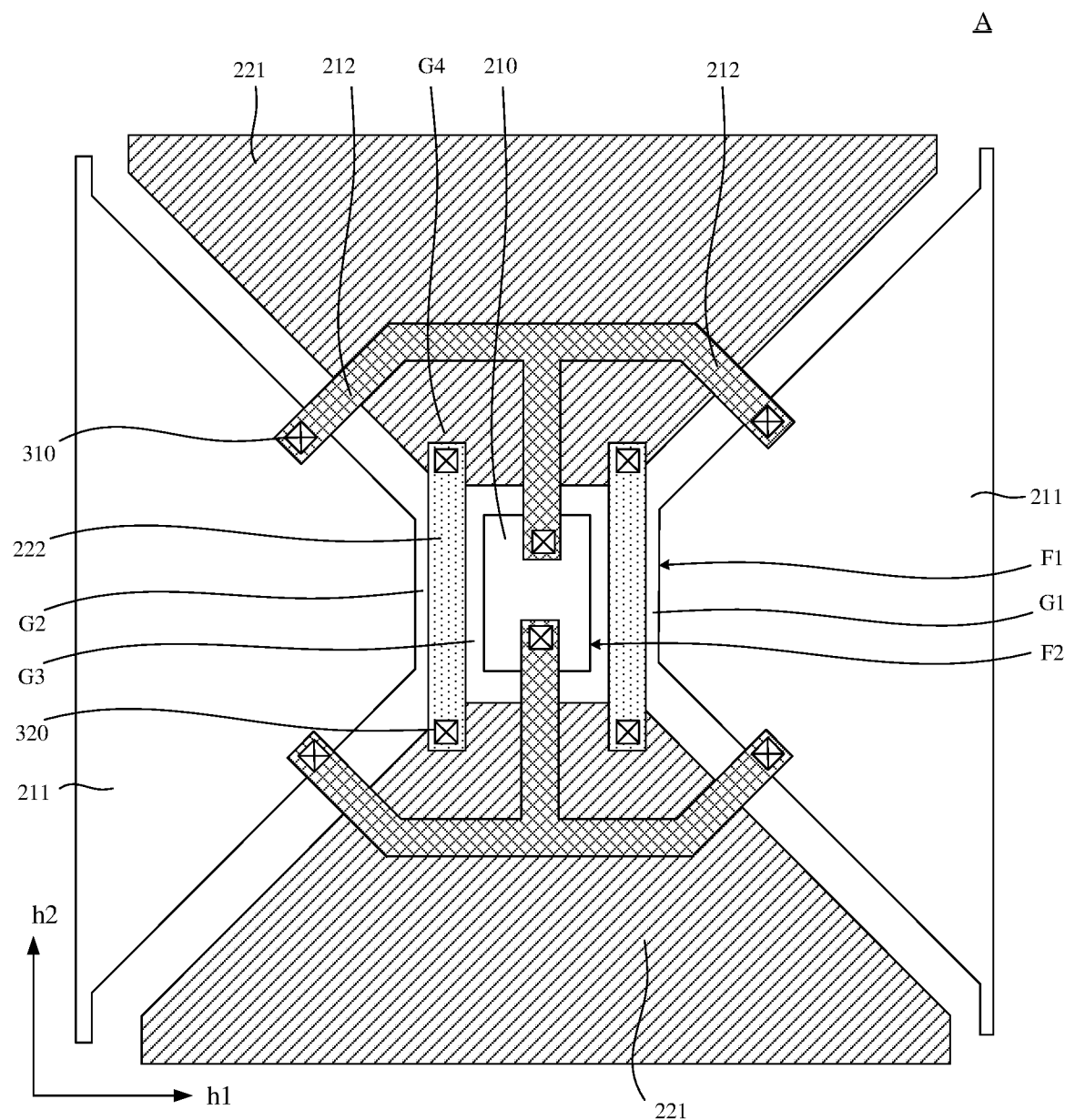
FIG. 4 is another enlarged schematic diagram showing the region A shown in FIG. 1.
Figure 5:
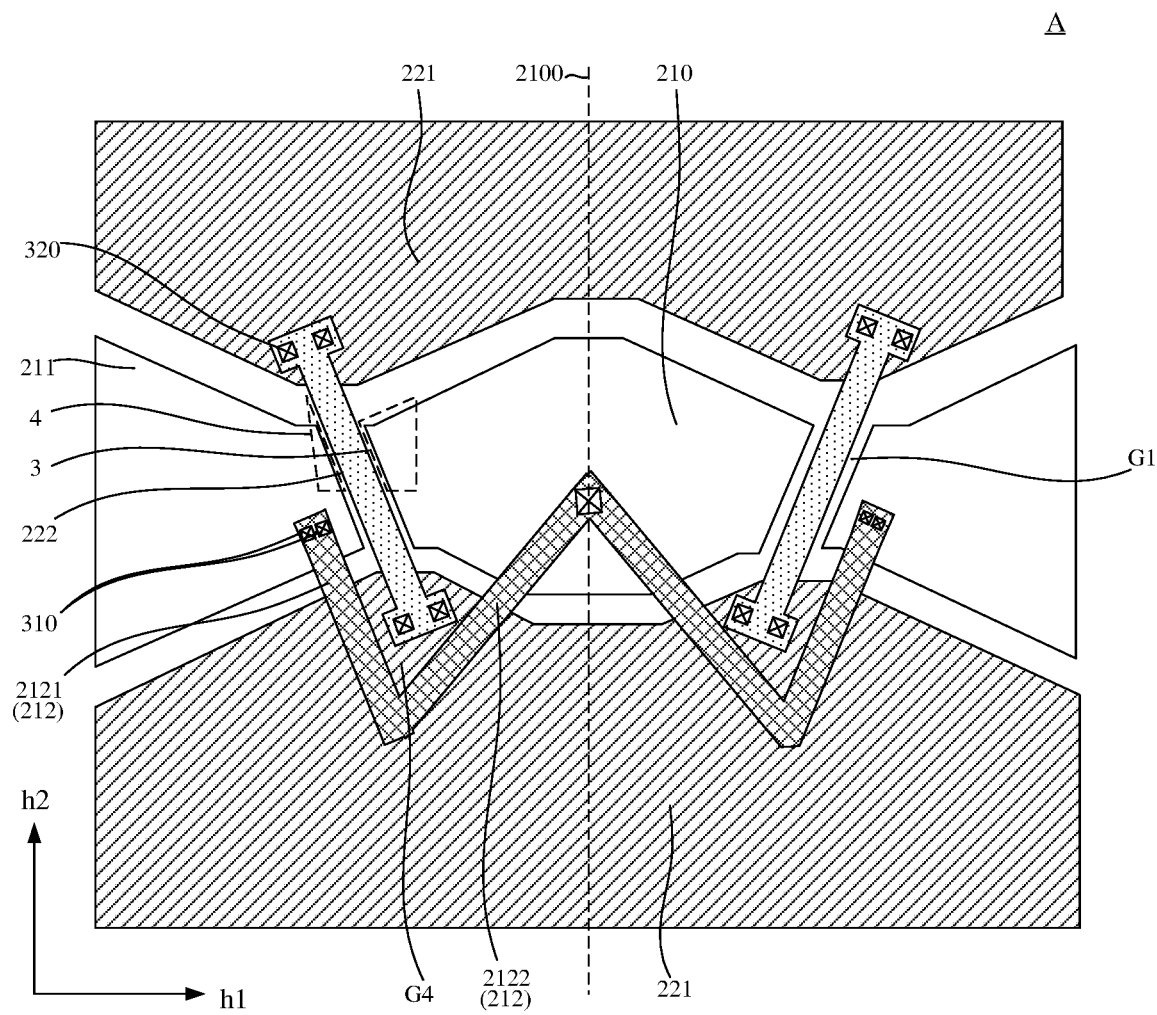
FIG. 5 is yet another enlarged schematic diagram showing the region A shown in FIG. 1.

In an embodiment of the present disclosure, two adjacent first connection portions 212 electrically connected to a same island electrode 210 can also be connected to each other. FIG. 4 is another enlarged schematic diagram showing the region A shown in FIG. 1. In an embodiment of the present disclosure, as shown in FIG. 4, orthographic projections of two adjacent first connection portions 212 electrically connected to a same island electrode 210 on the plane of the substrate 1 define a shape of approximate a Chinese character "凵". FIG. 5 is yet another enlarged schematic diagram showing the region A shown in FIG. 1. In an embodiment of the present disclosure, as shown in FIG. 5, orthographic projections of two adjacent first connection portions 212 electrically connected to the same island electrode 210 in the plane of the substrate 1 can have a shape of approximate "M" or "W".

Exemplarily, in an embodiment of the present disclosure, as shown in FIG. 2 and FIG. 4, the first touch sub-electrode 211 is electrically connected to the island electrode 210 through at least two first connection portions 212. With such configuration, on the one hand, a number of transmission channels of touch signal transmitted by the first touch electrode 21 can be increased, thereby improving touch performance of the display panel. On the other hand, the number of static electricity transmission channels in the first touch sub-electrode 211 and the island electrode 210 can also be increased, and it is conducive to transmission of static electricity between the first touch sub-electrode 211 and the island electrode 210, and thus the static electricity in the touch sub-electrode 211 or the island electrode 210 is conducted away in time through the first connection portion 212, thereby improving reliability of static electricity of the first touch electrode 21.

In an embodiment of the present disclosure, as shown in FIGS. 2 and 4, two adjacent second touch sub-electrodes 221 are connected by at least two second connection portions 222. With this configuration, the number of transmission paths of touch signal in the second touch electrode 221 can be increased, thereby improving touch performance of the display panel. On the other hand, providing at least two second connection portions 222 can also conduct static electricity in the second touch electrode 22 in time to prevent static electricity from accumulating in the second touch electrode 22, thereby improving reliability of static electricity of the second touch electrode 22.

In an embodiment, when the first touch sub-electrode 211 is electrically connected to the island electrode 210 through at least two first connection portions 212, as shown in FIGS. 2 and 4, the second connection portion 222 is located between two adjacent first connection portions 212 along the second direction h2. With such configuration, it is avoided that the second connection portion 222 surrounds the first connection portion, therefore achieving a good insulation between the first connection portion 212 and the second connection portion 222, shortening a length of the second connection portion 222, and reducing a resistance of the second connection portion 222.

Exemplarily, referring to FIGS. 2 and 4, a second gap G2 is formed between an orthographic projection of the second connection portion 222 on a plane of the substrate 1 and an orthographic projection of the first touch sub-electrode 211 on the plane of the substrate 1, and a third gap G3 is formed between an orthographic projection of the second connection portion 222 on the plane of the substrate 1 and an orthographic projection of the island electrode 210 on the plane of the substrate 1. With such configuration, it can be avoided that the second connection portion 222 overlaps with the first touch sub-electrode 211 along a thickness direction of the display panel, and that the second connection portion 222 overlaps with the island electrode 210 along a thickness direction of the display panel, thereby reducing a coupling capacitance between the connection portion 222 and the first touch sub-electrode 211, and reducing a coupling capacitance between the second connection portion 222 and the island electrode 210. If the coupling capacitance between the second connection portion 222 and the first touch sub-electrode 211 is relatively large, or the coupling capacitance between the second connection portion 222 and the island electrode 210 is relatively large, static electricity tends to accumulate at an overlapping position where the second connection portion 222 overlaps with the first touch sub-electrode 211 or the island electrode 210 when static electricity is transmitted to the overlapping position. In this way, if the static electricity accumulates too much, a risk of electrostatic breakdown can occur in an insulation layer between the second connection portion 222 and the first touch sub-electrode 211 or an insulation layer between the second connection portion 222 and the island electrode 210. In an embodiment of the present disclosure, the second gap G2 is formed between an orthographic projection of the second connection portion 222 on the plane of the substrate 1 and an orthographic projection of the first touch sub-electrode 211 on the plane of the substrate 1, and the third gap G3 is formed between an orthographic projection of the second connection portion 222 on the plane of the substrate 1 and the orthographic projection of the island electrode 210 on the plane of the substrate 1, so that the coupling capacitance can be reduced, thereby avoiding accumulation of static electricity at a partial position in the connection portion 222 or the first touch electrode 21, and improving antistatic damage ability of the display panel.

In an embodiment, as shown in FIGS. 2 and 4, the orthographic projection of the second connection portion 222 on the plane of the substrate 1, the second gap G2 and the third gap G3 are all located in the first gap G1 formed between the first touch sub-electrode 211 and the island electrode 210. The second gap G2 and the third gap G3 are respectively located at both sides of the orthographic projection of the second connection portion 222 on the plane of the substrate 1, that is, the orthographic projection of the second connection portion 222 on the plane of the substrate 1 is located between the orthographic projection of the island electrode 210 on the plane of the substrate 1 and the orthographic projection of the first touch sub-electrode 211 on the plane of the substrate 1, so that a pattern of the orthographic projection of the island electrode 210 on the plane of the substrate 1 can be a continuous pattern while the second connection portion 222 does not overlap with the island electrode 210 or the first touch sub-electrode 211, thereby avoiding providing a slit in the island electrode 210. In this way, a pattern of the orthographic projection of the first touch sub-electrode 211 on the plane of the substrate 1 can be a continuous pattern, thereby avoiding providing a slit in the first touch sub-electrode 211, and increasing areas of the island electrode 210 and the first touch sub-electrode 211.

In an embodiment, as shown in FIGS. 2 and 4, the island electrode 210 is located between two adjacent second touch sub-electrodes 221 along the second direction h2, that is, the island electrode 210 is located at an insulation intersecting position between the first touch electrode 21 and the second touch electrode 22, avoiding digging a hole in the first touch sub-electrode 211 or the second touch sub-electrode 212 as an accommodation space for the island electrode 210. Therefore, patterns of orthographic projections of the first touch sub-electrode 211 and the second touch sub-electrode 212 on the plane of the substrate 1 can be a complete blocky pattern.

Exemplarily, as shown in FIGS. 2 and 4, in an embodiment of the present disclosure, the first gap G1 can have a same width at different positions. As mentioned above, the first gap G1 is defined by an edge of the first touch sub-electrode 211 close to the island electrode 210 and an edge of the island electrode 210 close to the first touch sub-electrode 211. For clarifying embodiments of the present disclosure, the edge of the first touch sub-electrode 211 close to the island electrode 210 is named a first edge, which is marked as F1 in FIGS. 2 and 4, and the edge of the island electrode 210 close to the first touch sub-electrode 211 is named a second edge, which is marked as F2 in FIGS. 2 and 4. In an embodiment of the present disclosure, a width of the first gap G1 at any position is the shortest distance between the first edge F1 and the second edge F2 at a corresponding position.

Exemplarily, in an embodiment of the present disclosure, the first edge F1 and the second edge F2 can be parallel to each other so that the first gap G1 has the same width everywhere.

In an embodiment of the present disclosure, the shapes of two opposite edges of the second connection portion 222 along the first direction h1 can be parallel to the first edge F1 and the second edge F2, respectively. With such configuration, the width of the second connection portion 222 can be increased while achieving that the second connection portion 222 does not overlap with the first touch sub-electrode 211 and the island electrode 210 along a thickness direction of the display panel. The width direction of the second connection portion 222 is perpendicular to the direction of current flowing through the second connection portion 222. With such configuration, it is beneficial to reduce the resistance of the second connection portion 222 and improve a transmission rate of the touch signal and static electricity in the second touch electrode 22. Moreover, it is beneficial to conduct static electricity away from the second touch electrode 22 in time while achieving touch sensitivity, and to improve antistatic breakdown capability of the second touch electrode 22.

Exemplarily, as shown in FIGS. 2 and 4, in an embodiment of the present disclosure, a width of the first gap G1 between the island electrode 210 and the first touch sub-electrode 211 is greater than or equal to a width of the second connection portion 222. A width direction of the first gap G1 is perpendicular to an extending direction of the first gap G1, and a width direction of the second connection portion 222 is perpendicular to an extending direction of the second connection portion 222. In an embodiment of the present disclosure, by making the width of the first gap G1 as large as possible, the orthographic projection of the second connection portion 222 on the plane of the substrate 1 can be located in the first gap G1, so that the second connection portion 222 can be provided away from the first touch sub-electrode 211 and the island electrode 210, thereby reducing possibility of overlapping the second connection portion 222 with the first touch electrode 21, and improving antistatic breakdown capability of the first touch electrode 21 and the second touch electrode 22.

When designing the island electrode 210, in an embodiment of the present disclosure, a shape of the orthographic projection of the island electrode 210 on the plane of the substrate 1 can be set as a polygon.

Exemplarily, as shown in FIGS. 2 and 4, in an embodiment of the present disclosure, the island electrode 210 can have the same width at different positions. The width direction of the island electrode 210 is parallel to the second direction h2. With such configuration, when static electricity is transmitted between two adjacent first touch sub-electrodes 211 through the island electrode 210, the resistance of the island electrode 210 at different positions can tend to be consistent. Since static electricity tends to accumulate at locations where the resistance is relatively large, the location where the resistance is relatively large becomes a location having weak static electricity. With such configuration according to embodiments of the present disclosure, the number of the location having weak static electricity in the island electrode 210 can be reduced or even eliminated, and a touch reliability of the display panel can be improved.

In an embodiment of the present disclosure, a convex portion can be provided at an edge (that is, the second edge F2) of the island electrode 210 close to the first touch sub-electrode 211, and the convex portion can be protruded toward an edge close to the first touch sub-electrode 211. A concave portion can be provided at an edge (that is, the first edge F1) of the first touch sub-electrode 211 close to the island electrode 210. The concave portion and the convex portion can be separated by a certain distance so that at least a part of the above-mentioned first gap G1 is formed correspondingly between the concave portion and the convex portion.

Figure 6:
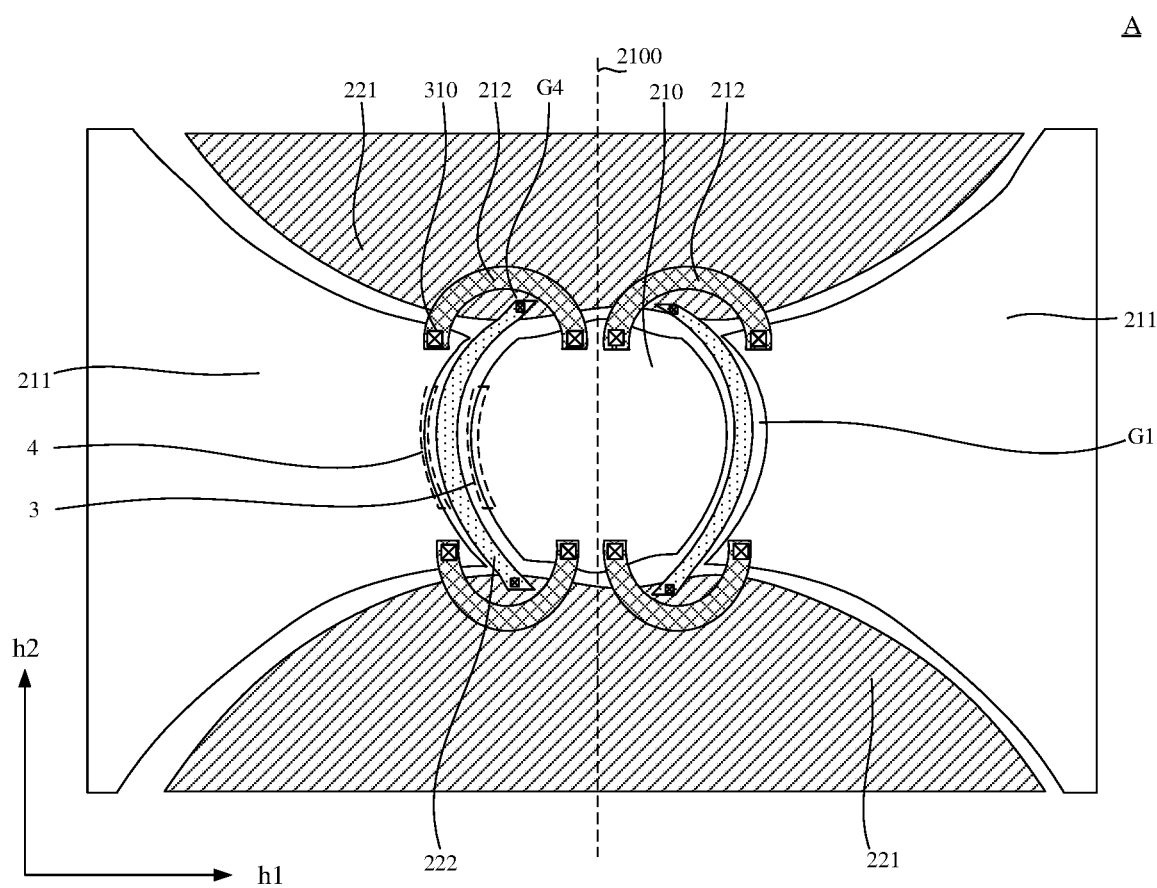
FIG. 6 is still yet another enlarged schematic diagram showing the region A shown in FIG. 1.

FIG. 6 is still yet another enlarged schematic diagram showing the region A shown in FIG. 1. In FIG. 5, a shape of the island electrode 210 is shown as a polygon. In FIG. 6, a shape of the island electrode 210 is shown as an approximate circle. As shown in FIGS. 5 and 6, the edges of the island electrode 210 close to the first touch sub-electrode 211 all include a convex portion 3 protruding toward the side close to the first touch sub-electrode 211. The edges of the first touch sub-electrode 211 close to the island electrode 210 all include a concave portion 4. The concave portion 4 and the convex portion 3 are separated by a certain distance so that at least a part of the first gap G1 is formed correspondingly between the concave portion 4 and the convex portion 3. In an embodiment of the present disclosure, the convex portion 3 is provided on the edge of the island electrode 210 close to the first touch sub-electrode 211, and the orthographic projection of the second connection portion 222 on the plane of the substrate 1 does not overlap with the orthographic projection of the convex portion 3 on the plane of the substrate 1. With such configuration, when two second connection portions 222 connecting two adjacent second touch sub-electrodes 221 are provided, the maximum distance between two adjacent second connection portions 222 can be increased, thereby improving antistatic breakdown capability of the display panel.

Exemplarily, when the island electrode 210 is provided, as shown in FIGS. 5 and 6, in an embodiment of the present disclosure, the orthographic projection of the island electrode 210 on the plane of the substrate 1 can be set as an axially symmetrical pattern, and its symmetry axis 2100 extends in the second direction h2, and the maximum distance between the convex portion 3 and the symmetry axis 2100 is greater than the maximum distance between other positions of the second edge F2 and the symmetry axis 2100.

In an embodiment of the present disclosure, the shape of the convex portion 3 can be set to match with the shape of the concave portion 4. Exemplarily, when the surfaces opposite to each other of the convex portion 3 and the concave portion 4 are set as two arc surfaces, orthographic projections of the two arc surfaces on the plane of the substrate 1 can be a part of two concentric rings, respectively. A radius of the concentric ring where the arc surface included in the concave portion 4 is located is relatively large, and the radius of the concentric ring where the arc surface included in the convex portion 3 is located is relatively small.

Exemplarily, in an embodiment of the present disclosure, the shape of the orthographic projection of at least part of edge of the island electrode 210 on the plane of the substrate 1 can be designed as an arc shape. As shown in FIG. 6, in an embodiment of the present disclosure, the shape of the orthographic projection of the island electrode 210 on the plane of the substrate 1 can also be designed as a circular or approximately circular curved shape. With such configuration, on the one hand, the maximum distance between two adjacent second connection portions 222 can be increased, so that the risk of electrostatic breakdown of the touch display panel can be reduced. On the other hand, an outer surface of the island electrode 210 can also be prevented from forming a sharper convex or concave structure. When static electricity is transmitted in the island electrode 210, concentrated accumulation of static electricity in sharp locations can be avoided, so that it is beneficial to further improve the antistatic capability of the first touch electrode 21 to which the island electrode 210 belongs.

Figure 7:
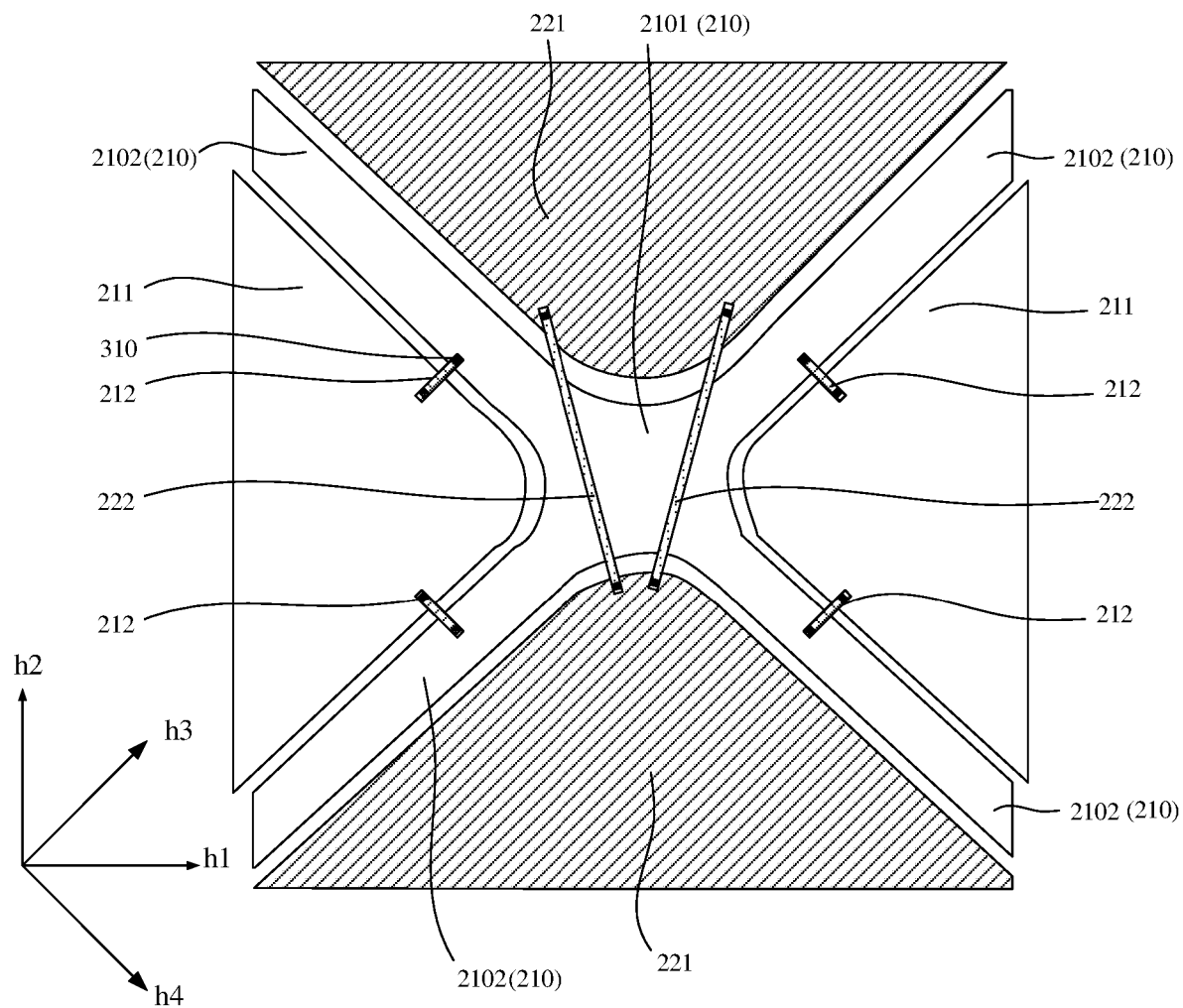
FIG. 7 is an enlarged schematic diagram showing a partial region of a display panel according to an embodiment of the present disclosure.

FIG. 7 is an enlarged schematic diagram showing a partial region of a display panel according to an embodiment of the present disclosure. As shown in FIG. 7, the island electrode 210 includes a first island sub-electrode 2101 and at least four second island sub-electrodes 2102. The first island sub-electrode 2101 and the second island sub-electrode 2102 are connected to each other. Exemplarily, the first island sub-electrode 2101 and the second island sub-electrode 2102 can be provided in a same layer.

Along the first direction h1, the first island sub-electrode 2101 is located between two adjacent first touch sub-electrodes 211. Along the second direction h2, the first island sub-electrode 2101 is located between two adjacent second touch sub-electrodes 221. Along a third direction h3, a part of the second island sub-electrodes 2102 is located between the first touch sub-electrodes 211 and the second touch sub-electrodes 221 that are adjacent to each other, and along a fourth direction h4, the other part of the second island sub-electrode 2102 is located between the first touch sub-electrode 211 and the second touch sub-electrode 221 that are adjacent to each other. The third direction h3 intersects with both the first direction h1 and the second direction h2. The fourth direction h4 intersects both the first direction h1 and the second direction h2. The third direction h3 intersects the fourth direction h4.

As shown in FIG. 7, one island electrode 210 is electrically connected to four first connection portions 212, two first connection portions 212 are connected to the first touch sub-electrode 211 at a side of the island electrode 210, and the other two first connection portions 212 are connected to the other first touch sub-electrode 211 at another side of the island electrode 210. The orthographic projection of the first connection portion 212 on the plane of the substrate 1 at least partially overlaps with the orthographic projection of the second island sub-electrode 2102 on the plane of the substrate 1. The first connection portion 212 is electrically connected to the second island sub-electrode 2102 via the first via 310.

In an embodiment of the present disclosure, the island electrode 210 is designed according to the structure shown in FIG. 7, the number of the first connection portion 212 between the first touch sub-electrode 211 and the island electrode 210 can be increased while the connection portion 212 is electrically connected to the second island sub-electrode 2102, so that the distance between two adjacent first connection portions 212, thereby improving the antistatic capability of the touch electrode.

Figure 8:
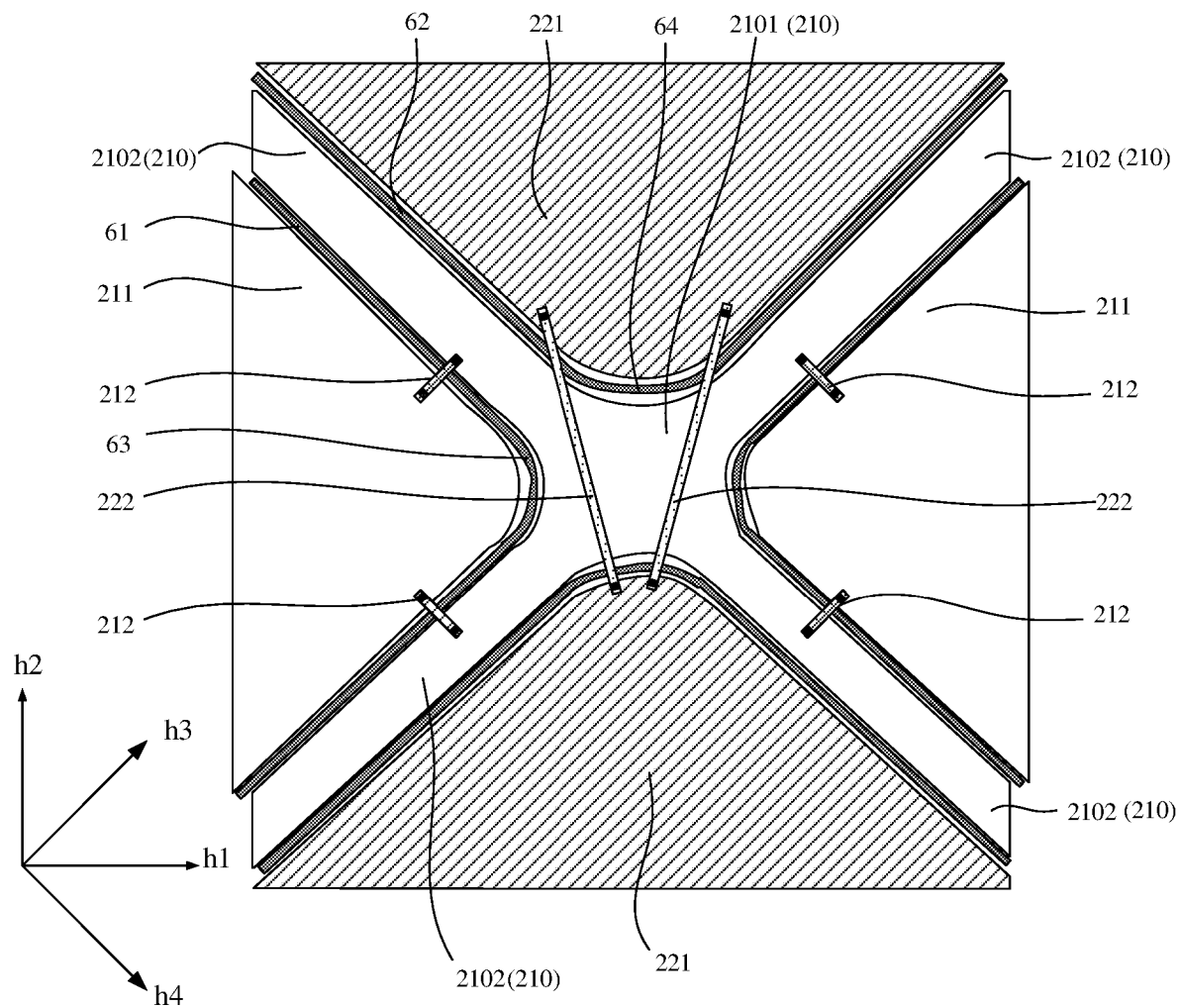
FIG. 8 is an enlarged schematic diagram showing a partial region of a display panel according to another embodiment of the present disclosure.

FIG. 8 is an enlarged schematic diagram showing a partial region of a display panel according to another embodiment of the present disclosure. Exemplarily, as shown in FIG. 8, the display panel provided by an embodiment of the present disclosure further includes a first dummy electrode 61, a second dummy electrode 62, a third dummy electrode 63, and a fourth dummy electrode 64. In an embodiment of the present disclosure, the first dummy electrode 61, the second dummy electrode 62, the third dummy electrode 63, and the fourth dummy electrode 64 are all floating, that is, none of the first dummy electrode 61, the second dummy electrode 62, the third dummy electrode 63, and the fourth dummy electrode 64 receives electrical signals.

The first dummy electrode 61 is located between the first touch sub-electrode 211 and the second island sub-electrode 2102. The second dummy electrode 62 is located between the second touch sub-electrode 221 and the second island sub-electrode 2102. The third dummy electrode 63 is located between the first touch sub-electrode 211 and the first island sub-electrode 2101. The fourth dummy electrode 64 is located between the second touch sub-electrode 212 and the first island sub-electrode 2101.

When the display panel performs a touch operation, the first touch electrode 21 and the second touch electrode 22 transmit different signals. The first dummy electrode 61 can separate the first touch sub-electrode 211 from the second island sub-electrode 2102, so that the first dummy electrode 61 can have a function of shielding the first touch sub-electrode 211 and the second island sub-electrode 2102. Therefore, mutual interference of signals between the first touch sub-electrode 211 and the second island sub-electrode 2102 can be reduced, and the coupling capacitance between the first touch sub-electrode 211 and the second island sub-electrode 2102 can be reduced, so that charging time of at least one of the first touch electrode 21 or the second touch electrode 22 can be reduced, thereby improving touchreport rate of the touch display panel. Similarly, the second dummy electrode 62, the third dummy electrode 63, and the fourth dummy electrode 64 can also have a function of reducing signal interference between the first touch electrode 21 and the second touch electrode 22. Its principle is similar to that of the first dummy electrode 61, and will not be elaborated here.

Exemplarily, the first dummy electrode 61, the second dummy electrode 62, the third dummy electrode 63, and the fourth dummy electrode 64 can be provided in the same layer as the second island sub-electrode 2102. When manufacturing the display panel, the first dummy electrode 61, the second dummy electrode 62, the third dummy electrode 63, and the fourth dummy electrode 64 can be formed by patterning the same layer as the second island electrode 2102, so that manufacturing processes of the display panel is simplified, thereby improving process efficiency and reducing cost.

Exemplarily, in an embodiment of the present disclosure, the first connection portion 212 and the second connection portion 222 can be provided in the same layer. When manufacturing the display panel, the first connection portion 212 and the second connection portion 222 can be formed by patterning the same layer in order to simplify manufacturing processes of the display panel, improve process efficiency, and reduce cost. It should be noted that positional relationship of the layer where the first connection portion 212 and the first touch sub-electrode 211 shown in FIGS. 2 and 3 are located is merely illustrative. In an actual design process of the display panel, the first touch sub-electrode 211 can be located at a side of the first connection portion 212 close to the substrate 1, as shown in FIGS. 2 and 3. In an embodiment, the first connection portion 212 can be located at a side of the first touch sub-electrode 211 close to the substrate 1, which is not limited thereto in embodiments of the present disclosure.

Exemplarily, as shown in FIGS. 2, 4, 5, and 6, in embodiments of the present disclosure, a fourth gap G4 is formed between an orthographic projection of the first connection portion 212 on the plane of the substrate 1 and an orthographic projection of the second connection portion 222 on the plane of the substrate 1, that is, the orthographic projection of the first connection portion 212 on the plane of the substrate 1 does not overlap with the orthographic projection of the second connection portion 222 on the plane of the substrate 1. In embodiments of the present disclosure, the fourth gap G4 is formed between the orthographic projection of the first connection portion 212 on the plane of the substrate 1 and the orthographic projection of the second connection portion 222 on the plane of the substrate 1, so that good insulation between the first connection portion 212 and the second connection portion 222 can be achieved, thereby avoiding short circuit occurring between the first connection portion 212 and the second connection portion 222 and achieving reliability of touch performance of the display panel.

In an embodiment of the present disclosure, a shortest distance between the first connection portion 212 and the second connection portion 222 is greater than or equal to 50 μm. That is to say, in an embodiment of the present disclosure, a width of the fourth gap G4 at the narrowest position is 50 μm, thereby achieving good insulation between the first connection portion 212 and the second connection portion 222.

Figure 9:
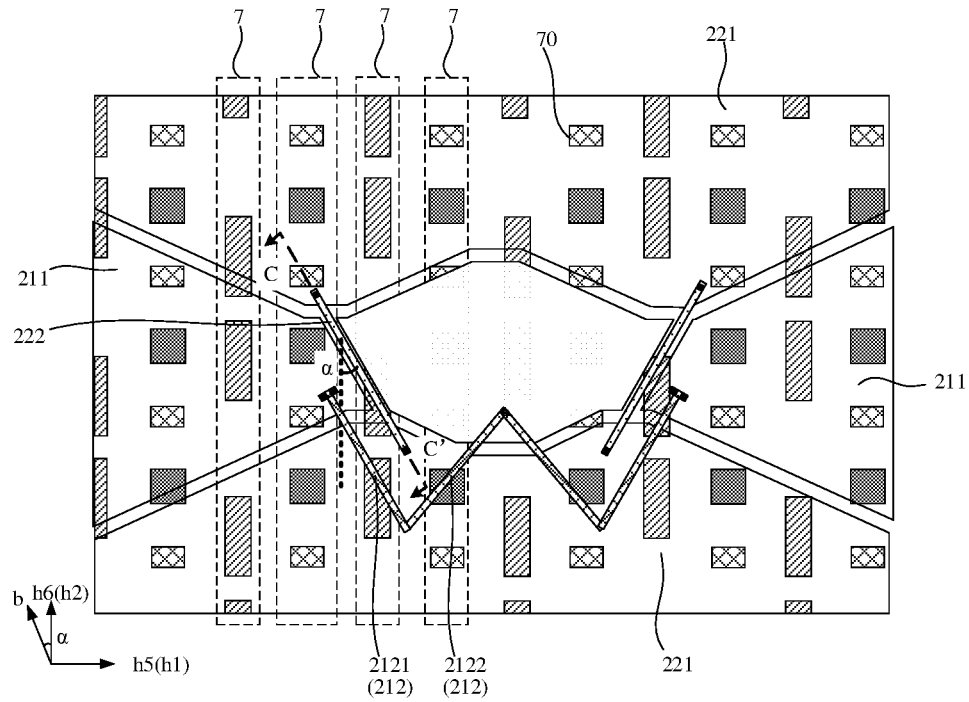
FIG. 9 is an enlarged schematic diagram showing a partial region of a display panel according to yet another embodiment of the present disclosure.
Figure 10:
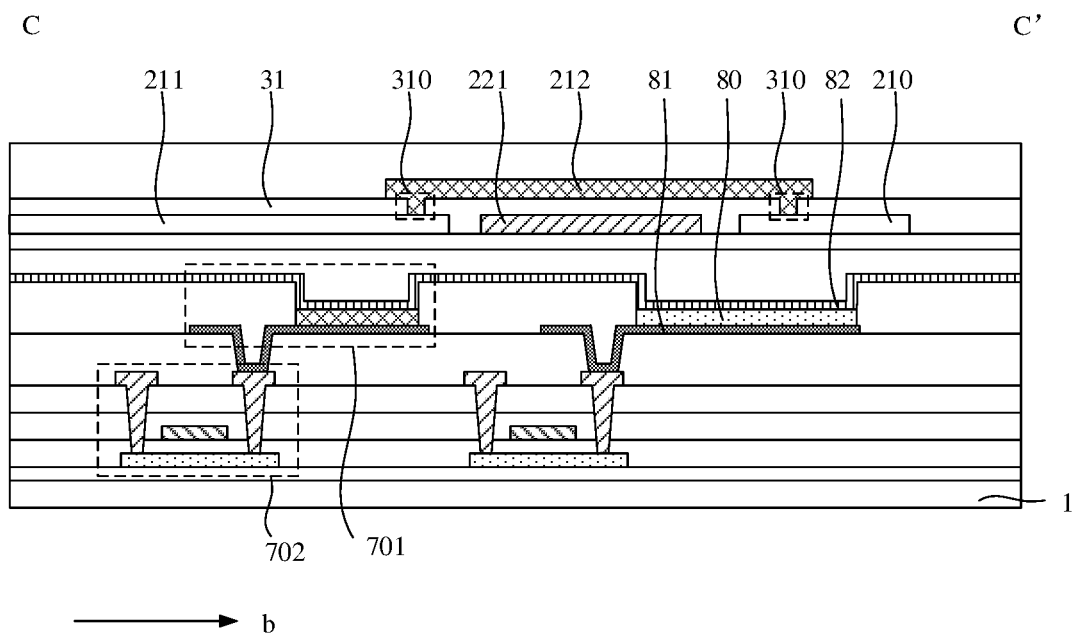
FIG. 10 is a schematic cross-sectional view taken along CC' shown in FIG. 9.

FIG. 9 is an enlarged schematic diagram showing a partial region of a display panel according to yet another embodiment of the present disclosure, and FIG. 10 is a schematic cross-sectional view taken along CC' shown in FIG. 9. Exemplarily, as shown in FIGS. 9 and 10, the display panel further includes a plurality of sub-pixel columns 7 which is arranged along a fifth direction h5, and sub-pixels 70 arranged along a sixth direction h6 are provided in the sub-pixel column 7. The first touch sub-electrode 21 and the second touch sub-electrode 22 are located at a light-emitting side of the sub-pixel 70.

In an embodiment of the present disclosure, the display panel can be a liquid crystal display (LCD). In an embodiment, the display panel can also be other display panels with self-luminous technologies, such as an organic light-emitting diode (OLED) display panel, a micro light-emitting diode (Micro-LED) display panel, a quantum light-emitting diode (QLED) display panel, which are not limited thereto in embodiments of the present disclosure. FIG. 10 is only a schematic diagram taking the display panel to be an OLED display panel as an example. The sub-pixel 70 includes a light-emitting component 701 and a pixel drive circuit 702 that are electrically connected to each other. The light-emitting component 701 includes a first electrode 81, a light-emitting layer 80, and a second electrode 82, which are opposite to each other. The pixel drive circuit 702 includes a thin film transistor and a storage capacitor. In FIG. 10, only one thin film transistor connected to the light-emitting component 701 is taken as an illustration.

Exemplarily, as shown in FIG. 9, in an embodiment of the present disclosure, a non-zero intersection angle α is formed between an extending direction b of the second connection portion 222 and the sixth direction h6, that is, the second connection portion 222 is designed to be inclined relative to the extending direction of the pixel column 7, so that the non-zero intersection angle α is formed between the extending direction b of the second connection portion 222 and an arrangement direction (i.e., the sixth direction h6) of the sub-pixels 70 in a same pixel column 7. With such configuration, on the one hand, the number of sub-pixels 70 overlapping with the second connection portion 222 can be reduced, on the other hand, when the number of sub-pixels 70 overlapping with the second connection portion 222 is constant, positions of the sub-pixels 70 overlapping with the second connection portion 222 can also be arranged scattering in different pixel columns 7, thereby avoiding concentrated distribution of the sub-pixels 70 affected by the second connection portion 222, and reducing visibility of the connection portion 222. With such configuration, it is ensured that the second connection portion 222 overlaps with a smaller number of sub-pixels 70 in a same pixel column 7 and the alignment accuracy requirements of the display layer where the sub-pixels are located, the touch layer where the second touch electrode 22 is located can be reduced, thereby reducing process difficulty. In the manufacturing process of the display panel, the alignment accuracy between the display layer and the touch layer is taken into account, however, taking accuracy limitation of alignment process into account, an alignment error is inevitable. Therefore, if it is desired to make the second connection portion 222 away from the sub-pixel 70 by setting the extending direction of the second connection portion 222 to be parallel to the sixth direction h6 and by making the second connection portion 222 to be located between two pixel rows 7 adjacent to each other along the fifth direction h5, a high alignment accuracy is required. If an alignment deviation occurs, the second connection portion 222 will overlap with the sub-pixels 70 located in a same pixel column 7, thereby causing the second connection portion 222 to be visible by human eye. It can be seen that, with such configuration manner according to embodiments of the present disclosure, by designing the second connection portion 222 to be inclined with respect to the extending direction of the pixel column 7, it is possible to reduce alignment accuracy requirements of the display layer where the first touch electrode is located and the touch layer where the first touch electrode is located while reducing visibility of the second connection portion 222, so that it is beneficial to reduce process difficulty and reduce production cost.

It should be noted that the arrangement of the first touch electrodes 21 and the second touch electrodes 22 in the touch layer and an arrangement of the sub-pixels 70 in the display layer in embodiments of the present disclosure are not limited. For example, in an embodiment of the present disclosure, the fifth direction h5 can be parallel to the first direction h1 or the second direction h2. In an embodiment, the fifth direction h5 can intersect with the first direction h1 and the second direction h2. In FIG. 9, schematically, the fifth direction h5 is parallel to the first direction h1, and the sixth direction h6 is parallel to the second direction h2.

When designing the first connection portion 212, as shown in FIGS. 5 and 9, in an embodiment of the present disclosure, the first connection portion 212 can include a first connection sub-portion 2121 and a second connection sub-portion 2122 that are connected to each other. An extending direction of the first connection sub-portion 2121 intersects with an extending direction of the second connection sub-portion 2122. An orthographic projection of the first connection sub-portion 2121 on the plane of the substrate 1 at least partially overlaps with an orthographic projection of the first touch sub-electrode 211 on the plane of the substrate 1. The orthographic projection of the first connection sub-portion 2121 on the plane of the substrate 1 at least partially overlaps with an orthographic projection of the second touch sub-electrode 221 on the plane of the substrate 1. An orthographic projection of the second connection sub-portion 2122 on the plane of the substrate 1 at least partially overlaps with an orthographic projection of the second touch sub-electrode 221 on the plane of the substrate 1. The orthographic projection of the second connection sub-portion 2122 on the plane of the substrate 1 at least partially overlaps with the orthographic projection of the island electrode 210 on the plane of the substrate 1.

Exemplarily, in an embodiment of the present disclosure, the extending direction of the first connection sub-portion 2121 or the extending direction of the second connection sub-portion 2122 can be parallel to the extending direction of the second connection portion 222. With such configuration, visibility of the first connection sub-portion 2121 or the second connection sub-portion 2122 can be reduced. As shown in FIGS. 5 and 9, the extending direction of the first connection sub-portion 2121 is set to be parallel to the extending direction of the second connection portion 222.

In embodiments of the present disclosure, as shown in FIGS. 2 and 6, the shape of the orthographic projection of the first connection portion 212 on the plane where the substrate 1 can be an arc shape, so that the number of the sub-pixels (not shown in FIGS. 2 and 6) shielded by the first connection portion 212 can be reduced, thereby reducing visibility of the first connection portion 212.

In an embodiment of the present disclosure, the first connection portion 212 can be connected to the first touch sub-electrode 211 through at least two vias 310, and/or, the first connection portion 212 can be connected to the island electrode 210 through at least two vias 310. With such configuration, on the one hand, impedance of the touch signal transmitted between the first connection portion 212 and the first touch sub-electrode 211 can be reduced, so that it is beneficial to increase transmission rate of the touch signal. On the other hand, a transmission rate of the static electricity between the first connection portion 212 and the first touch sub-electrode 211 can also be increased, so as to avoid that the static electricity accumulating at a local position of the first touch electrode 21, thereby reducing the possibility of electrostatic breakdown at a part of the first touch electrode 21, and improving antistatic capability of the first touch electrode 21.

In an embodiment of the present disclosure, as shown in FIG. 5, at least two vias 310 are arranged along a width direction of the first connection portion 212 so as to avoid increasing a length of the first connection portion 212, so that an area of the sub-pixels shielded by the first connection portion 212 can be reduced, thereby reducing visibility of the first connection portion 212. The width direction of the first connection portion 212 is perpendicular to the extending direction of the first connection portion 212.

Exemplarily, in an embodiment of the present disclosure, as shown in FIG. 1, the display panel includes touch units 700 arranged in a matrix. The touch unit 700 includes at least a part of the first touch electrode 21 and at least a part of the second touch electrode 22. As shown in FIG. 1, an area of the orthographic projection of the touch unit 700 on the plane of the substrate 1 is approximately rectangular. In a same touch unit 700, a sum S1 of areas of the first touch sub-electrodes and an area of the island electrode and a sum S2 of areas of the second touch sub-electrodes satisfy: S1=S2, so that touch uniformity of the display panel at different positions can be improved, thereby improving the touch performance of the display panel.

Exemplarily, in an embodiment of the present disclosure, the first connection portion 212 and/or the second connection portion 222 can be made of a material of transparent conductive oxide, such as indium tin oxide (ITO), indium zinc oxide (IZO) and indium gallium zinc oxide (IGZO) so as to reduce visibility of the first connection portion 212 and the second connection portion 222.

In an embodiment, in a case where the first connection portion 212 and the second connection portion 222 are made of a transparent metal oxide, the width of the first connection portion 212 and/or the second connection portion 222 can be greater than or equal to 50 μm so as to reduce the resistance of the first connection portion 212 and/or the second connection portion 222.

Exemplarily, in a case where the first connection portion 212 and the second connection portion 222 can be made of the transparent metal oxide, the distance between the first connection portion 212 and the second connection portion 222 that are adjacent to each other can be greater than or equal to 50 μm so as to achieve good insulation between the first connection portion 212 and the second connection portion 222.

In an embodiment of the present disclosure, the first connection portion 212 and/or the second connection portion 222 can be made of a metal material, so as to improve transmission performance of the touch signal by using good conductivity of the metal material.

Exemplarily, in a case where the first connection portion 212 and/or the second connection portion 222 can be made of the metal material, the width of the first connection portion 212 and/or the second connection portion 222 can be smaller than or equal to 10 μm, so as to reduce visibility of the first connection portion 212 and/or the second connection portion 222.

Exemplarily, in a case where the first connection portion 212 and/or the second connection portion 222 can be made of the metal material, the distance between the first connection portion 212 and the second connection portion 222 that are adjacent to each other can be greater than or equal to 3 μm so as to reduce a risk of short circuit between the first connection portion 212 and the second connection portion 222.

Figure 11:
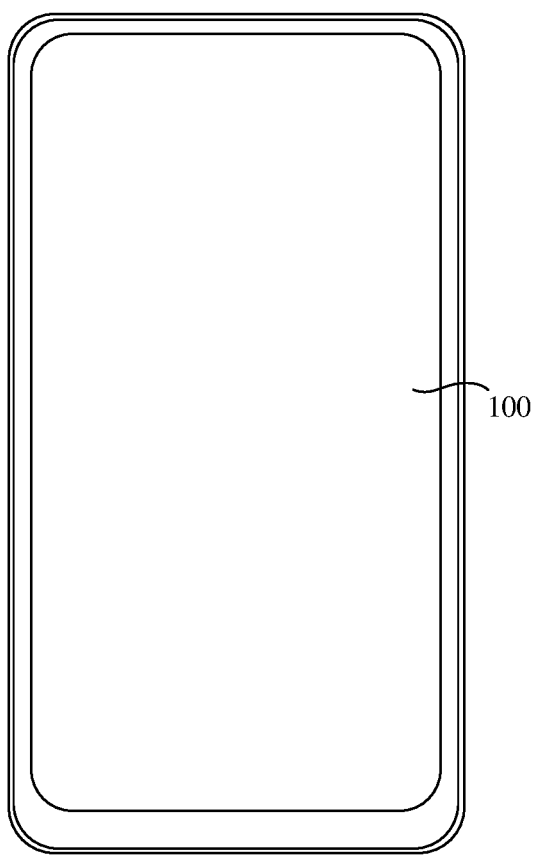
FIG. 11 is a schematic diagram showing a display device according to an embodiment of the present disclosure.

The present disclosure further provides a display device. FIG. 11 is a schematic diagram showing a display device according to an embodiment of the present disclosure. As shown in FIG. 11, the display device includes the display panel 100 described above. The specific structure of the display panel 100 has been described in detail in the above embodiments, which is not described in detail herein. The display device shown in FIG. 11 is merely illustrative, and the display device can be any electronic device having a display function, such as a mobile phone, a tablet computer, a laptop computer, an electronic paper book, or a television.

In the display device provided by embodiments of the present disclosure, the island electrode arranged at a certain distance from the first touch sub-electrode is provided in the first touch electrode, and the first touch sub-electrode is connected to the island electrode through the first connection portion, so as to avoid the first touch sub-electrode directly connecting the island electrode, thereby improving antistatic damage capability of the first touch electrode, and improving touch reliability of the display panel.

It should be understood that, in the case of no conflict, the above-mentioned embodiments and the above-mentioned features in the embodiments of the present disclosure can be combined with each other.

The above are merely some embodiments of the present disclosure, which, as mentioned above, are not used to limit the present disclosure. Whatever within the principles of the present disclosure, including any modification, equivalent substitution, improvement, etc., shall fall into the protection scope of the present disclosure.

What is claimed is:

1. A display panel, comprising:
   a substrate; and
   a first touch electrode and a second touch electrode that are located at a side of the substrate,
   wherein the first touch electrode comprises at least two first touch sub-electrodes arranged along a first direction, an island electrode located between two adjacent first touch sub-electrodes of the at least two first touch sub-electrodes, and at least one first connection portion;
   wherein the island electrode and the at least two first touch sub-electrodes are located in a same layer; a first gap is formed between the island electrode and one of the at least two first touch sub-electrodes; one of the at least one first connection portion connects one of the at least two first touch sub-electrodes and the island electrode that are adjacent to each other; and the at least one first connection portion is located in a different layer from the at least two first touch sub-electrodes; and
   wherein the second touch electrode comprises at least two second touch sub-electrodes arranged along a second direction, and at least one second connection portion connecting two adjacent second touch sub-electrodes of the at least two second touch sub-electrodes; the at least one second connection portion and the at least two second touch sub-electrodes are provided in different layers; and the first direction intersects with the second direction.

2. The display panel according to claim 1, wherein a second gap is formed between an orthographic projection of one of the at least one second connection portion on a plane of the substrate and an orthographic projection of one of the at least two first touch sub-electrodes on the plane of the substrate; and a third gap is formed between an orthographic projection of the one of the at least one second connection portion on the plane of the substrate and an orthographic projection of the island electrode on the plane of the substrate.

3. The display panel according to claim 1, wherein the at least one second connection portion comprises at least two second connection portions, two adjacent second touch sub-electrodes of the at least two second touch sub-electrodes are connected by at least two of the at least two second connection portions; and the island electrode is located between two adjacent second connection portions of the at least two second connection portions along the first direction.

4. The display panel according to claim 3, wherein an edge of the island electrode close to one of the at least two first touch sub-electrodes comprises a convex portion protruding toward a side close to one of the at least two first touch sub-electrodes; and an edge of one of the at least two first touch sub-electrodes close to the island electrode comprises a concave portion, and a gap is formed between the concave portion and the convex portion.

5. The display panel according to claim 2, wherein the orthographic projection of the one of the at least two second connection portions on the plane of the substrate is located between the orthographic projection of the island electrode on the plane of the substrate and the orthographic projection of the one of the at least two first touch sub-electrodes on the plane of the substrate.

6. The display panel according to claim 2, wherein the first gap has a width greater than or equal to a width of one of the at least one second connection portion, and has a width direction perpendicular to an extending direction of the first gap; and one of the at least one second connection portion has a width direction perpendicular to an extending direction of the second connection portion.

7. The display panel according to claim 1, wherein a fourth gap is formed between an orthographic projection of one of the at least one first connection portion on a plane of the substrate and an orthographic projection of one of the at least one second connection portion on the plane of the substrate.

8. The display panel according to claim 1, wherein the at least one first connection portion and the at least one second connection portion are located in a same layer.

9. The display panel according to claim 1, wherein one of the at least one first connection portion comprises a first connection sub-portion and a second connection sub-portion that are connected to each other, and an extending direction of the first connection sub-portion intersects with an extending direction of the second connection sub-portion;

an orthographic projection of the first connection sub-portion on the plane of the substrate at least partially overlaps with the first touch sub-electrode, and at least partially overlaps with the second touch sub-electrode;

an orthographic projection of the second connection sub-portion on the plane of the substrate at least partially overlaps with the second touch sub-electrode, and at least partially overlaps with the island electrode; and the extending direction of the first connection sub-portion or the extending direction of the second connection sub-portion is parallel to an extending direction of the second connection portion.

10. The display panel according to claim 1, wherein the at least one first connection portion comprises at least two first connection portions; and one of the at least two first touch sub-electrodes is electrically connected to the island electrode by at least two of the at least two first connection portions.

11. The display panel according to claim 10, wherein one of the at least one second connection portion is located between two adjacent first connection portions of the at least two first connection portions along the second direction.

12. The display panel according to claim 10, wherein the island electrode comprises a first island sub-electrode and at least four second island sub-electrodes, and the first island sub-electrode is connected to the at least four second island sub-electrodes;

the first island sub-electrode is located between two adjacent first touch sub-electrodes of the at least two first touch sub-electrodes along the first direction, and the first island sub-electrode is located between two adjacent second touch sub-electrodes of the at least two second touch sub-electrodes along the second direction;

the second island sub-electrode is located between one first touch sub-electrode of the at least two first touch sub-electrodes and one second touch sub-electrode of the at least two second touch sub-electrodes along the third direction, and the one first touch sub-electrode and the one second touch sub-electrode are adjacent to each other; and the third direction intersects with both the first direction and the second direction; and an orthographic projection of one of the at least two first connection portions on the plane of the substrate at least partially overlaps with an orthographic projection of the second island sub-electrode on the plane of the substrate.

13. The display panel according to claim 1, wherein one of the at least one first connection portion is connected to at least one of the island electrode or the at least two first touch sub-electrodes by at least two vias.

14. The display panel according to claim 13, wherein the at least two vias are arranged along a width direction of one of the at least one first connection portion.

15. The display panel according to claim 1, wherein a shortest distance between the at least one first connection portion and the at least one second connection portion is greater than or equal to 50 μm.

16. The display panel according to claim 1, further comprising:

a plurality of touch units arranged in a matrix, wherein each of the plurality of touch units comprises at least a part of first touch electrodes and at least a part of the second touch electrode; and wherein in a one of the plurality of touch units, a sum S1 of areas of at least two of the at least two first touch sub-electrodes and an area of the island electrode and a sum S2 of areas of at least two of the at least two second touch sub-electrodes satisfy: S1=S2.

17. The display panel according to claim 1, wherein the island electrode is located between two adjacent second touch sub-electrodes of the at least two second touch sub-electrodes along the second direction.

18. A display device, comprising a display panel, wherein the display panel comprises:

a substrate; and a first touch electrode and a second touch electrode that are located at a side of the substrate, wherein the first touch electrode comprises at least two first touch sub-electrodes arranged along a first direction, an island electrode located between two adjacent first touch sub-electrodes of the at least two first touch sub-electrodes, and at least one first connection portion;

wherein the island electrode and the at least two first touch sub-electrodes are located in a same layer; a first gap is formed between the island electrode and one of the at least two first touch sub-electrodes; one of the at least one first connection portion connects one of the at least two first touch sub-electrodes and the island electrode that are adjacent to each other; and the at least one first connection portion is located in a different layer from the at least two first touch sub-electrodes; and wherein the second touch electrode comprises at least two second touch sub-electrodes arranged along a second direction, and at least one second connection portion connecting two adjacent second touch sub-electrodes of the at least two second touch sub-electrodes; the at least one second connection portion and the at least two second touch sub-electrodes are provided in different layers; and the first direction intersects with the second direction.

* * * * *